United States Patent [19]
Schaeffer

[11] Patent Number: 5,300,331
[45] Date of Patent: Apr. 5, 1994

[54] METHOD AND APPARATUS FOR UV CURING THICK PIGMENTED COATINGS

[75] Inventor: William R. Schaeffer, Mt. Airy, Md.

[73] Assignee: Fusion Systems Corporation, Rockville, Md.

[21] Appl. No.: 19,824

[22] Filed: Feb. 19, 1993

Related U.S. Application Data

[63] Continuation of Ser. No. 766,279, Sep. 27, 1991, abandoned.

[51] Int. Cl.[5] .......................... B05D 3/06; B05D 3/02
[52] U.S. Cl. .................................. 427/493; 427/492; 427/514; 427/393; 427/397
[58] Field of Search ............... 427/514, 508, 180, 393, 427/397, 492, 493

[56] References Cited

U.S. PATENT DOCUMENTS

| | | | |
|---|---|---|---|
| 3,661,614 | 5/1972 | Basemir et al. | 427/54.1 |
| 3,850,675 | 11/1974 | Miller | 427/54.1 |
| 3,907,656 | 9/1975 | de Souza | 427/54.1 |
| 3,918,393 | 11/1975 | Hahn | 427/54.1 |
| 4,208,587 | 6/1980 | Eastlund et al. | |
| 4,313,969 | 2/1982 | Matthews . | |
| 4,421,784 | 12/1983 | Troue | 427/54.1 |
| 4,452,819 | 6/1984 | Inoue et al. | 427/514 |
| 4,538,358 | 9/1985 | Ericsson . | |
| 4,836,102 | 6/1989 | Cicci . | |
| 5,225,170 | 7/1993 | Kolk et al. | 427/492 |

OTHER PUBLICATIONS

"UV-Curable Unsaturated Polyester Systems for the Industrial Finishing of Furniture" Dr. Riberi, Seminar of Radtech Intl. North America, Atlanta, Ga., Aug. 23, 1990.

*Primary Examiner*—Marianne Padgett
*Attorney, Agent, or Firm*—Pollock, Vande Sande & Priddy

[57] ABSTRACT

A method and apparatus for the ultraviolet curing of pigmented coatings having a thickness from about 1 mm to about 10 mm at a high curing rate and a relatively low energy consumption per unit area of coating cured. A coated substrate is irradiated by a first high UV source having a spectral energy distribution of the discharge which is high in the range from about 350 nm to about 450 nm and by a second UV source having a spectral energy distribution of the discharge which is high in discrete regions through the range of about 200 nm to about 450 nm. Each UV source is powered by at least about 300 watts per inch of width of the coating.

19 Claims, 2 Drawing Sheets

METHOD AND APPARATUS FOR UV CURING THICK PIGMENTED COATINGS

This application is a continuation of application Ser. No. 07/766,279 filed Sep. 27, 1991, now abandoned.

FIELD OF THE INVENTION

The present invention pertains to processes and apparatus for ultraviolet curing thick, heavily pigmented coatings.

BACKGROUND OF THE INVENTION

Apparatus and processes currently used for curing thick pigmented coatings on furniture pieces are typically designed to cure the coating at a linear rate of about 8 meters/minute. In a first step 2-3 mils (100-125 microns) of a UV curable composition may be applied by spraying, roll coating or curtain coating for example, on a substrate such as a medium density fiber board (MDF). After coating, the MDF is introduced into a flash-off tunnel to remove residual volatile solvents the concentration of which typically ranges from about 30% to about 40% by weight. The residence time is usually 3 minutes at approximately 50° C. in circulating air. To maintain a 3 minute dwell in the flash-off tunnel at 8 meters/minute a tunnel 24 meters long is required.

After the residual solvent has been removed from the coating, the substrate is introduced into a tunnel for initial curing. This tunnel may contain, for example, TL03 lamps having these trate designations and peaked at 420 nm alternating with TL05 lamps operating in 360 nm range of the UV spectrum. Such lamps, manufactured by N. V. Phillips, are low pressure lamps each of which produces 120 watts of energy and is 48 inches long. This initial curing step also requires a 3 minute dwell time, and to maintain the rated line speed of 8 meter/minute, a 24 meter long tunnel is required. These low pressure lamps may be positioned, for example, on 12.7 cm centers along the entire length of the 24 meter tunnel. This length requires 192 low pressure lamps to carry out the initial curing phase of the process.

At this point the coating is soft and undercured at the surface. To impart the hard, scratch-resistant properties required of this coating, a final cure phase is required. The final cure is accomplished using medium pressure UV lamps operating at 80 w/cm. Three rows of lamps can achieve a line speed of approximately 2.5 meters per minute. For example, the first row of lamps may have an output peaked at 420 nm while the next two rows of lamps may have a 365 nm peak. In order to reach a desired production rate of 8 meters/minute, a total of 9 rows of 80 w/cm lamps is required, the first 3 rows having lamps producing the 420 nm energy, and the following 6 rows producing the 365 nm output. The total lamp input power per unit area is about 65 joules per square centimeter of cured coating. About 1/5 of this energy comes from the TL lamp. The light shielding and conveyor system to accommodate 9 rows of lamps is approximately 4 meters long.

The combined length of the flash-off tunnel, the initial cure zone and the final cure station is approximately 52 meters.

In some cases particularly when the pigment coating is white, in order to obtain the desired level of opacity, multiple thin layers must be applied using the above process.

When the low intensity TL lamps are employed in the initial cure zone of the process, the coating which is applied to the edge of the substrate may be tacky to the touch or in some cases may even be wet and uncured. In many cases, to obtain a complete cure on the vertical edges of the MDF board, a secondary cure mechanism is employed.

Typically cobalt peroxide is added to the coating composition and cure on the vertical edges is then completed in a matter of hours; however, the addition of cobalt peroxide to the coating has some decided disadvantages: (a) the pot life of the composition is greatly reduced, making it imperative that the coating equipment be thoroughly purged of coating material by the end of the work shift; and (b) the cobalt peroxide may cause premature gelation of the coating in the application equipment making laborious and time-consuming cleaning necessary, and causing the loss of valuable production time.

Additional disadvantages of the above described equipment and process are: (a) the high floor space requirement, which precludes its installation in small job shops, (b) high maintenance costs due to the large number of lamps which are needed, (c) the large number of parts in process at any given time, and d) in going through the curing line the article is heated sufficiently so that it must be cooled when it comes off the line so that substrates do not stick together when stacked.

SUMMARY OF THE INVENTION

It is one object of the present invention to provide an improved method and apparatus for curing, thick pigmented layers coated on a substrate.

It is another object of the invention to eliminate the need for a low intensity light tunnel for curing thick pigmented coatings.

It is still another object of the invention to eliminate the need to use, and the above mentioned disadvantages associated with, a peroxide catalyst such as cobalt peroxide, in thick pigmented coatings.

It is yet another object of the invention to reduce the floor space requirement of a thick pigmented coating curing line.

It is yet another object of the invention to provide a process and apparatus for; completely curing coatings on thick substrate articles including coatings borne on vertical or substantially vertical portions thereof.

It is yet another object of the invention to eliminate the need to cool articles bearing thick pigmented coatings after they are taken off the curing line and before they are stacked.

It is a further object of the invention to provide a process which reduces the energy required for curing thick pigmented coatings.

According to a first aspect of the invention, thick, pigmented coatings are subjected to ultraviolet radiation from a high intensity discharge lamp such as a medium pressure doped mercury lamp, which radiation is peaked at about 385 nanometers, at least about 50% of which is in the range of about 350 to 450 nanometers. The coatings are then treated with ultraviolet radiation from a high intensity non-doped discharge lamp, the spectral energy distribution of which is relatively high in discrete regions throughout the range of about 200 to about 450 nanometers. Both lamps are powered at at least 300 watts per inch of the width of the substrate. The second lamp is preferably powered at at least about 500 watts per inch and more preferably at about 600 or more watts per inch.

In particular, according to one aspect of the present invention relatively dark, for instance black, thick pigmented coatings are cured. Such coatings are first preferably subjected to ultraviolet radiation from a high intensity discharge and more preferably a medium pressure doped mercury lamp emitting radiation which normally peaks at about 385 nanometers, at least about 50%, preferably about 60% of which is in the range of about 350 to about 450 nanometers, and then treated with ultraviolet radiation from a higher intensity discharge lamp such as a medium pressure non-doped mercury lamp.

According to a further aspect of the invention relatively light colored, e.g. white, thick pigmented coatings are first subjected to ultraviolet radiation from a high intensity discharge medium pressure doped mercury lamp, which radiation is peaked at about 410 nanometers, at least about 40%, preferably about 50% of which is emitted in the range of about 400 to 450 nanometers, and second treated with ultraviolet radiation from a high intensity discharge, medium pressure, non-doped mercury lamp. Both lamps are powered at at least 400 watts per inch of width of substrate to be cured and are more preferably powered at about 600 or more watts per inch of substrate.

According to a still further aspect of the invention the curing lamp which comprises an elliptical reflector and an ultraviolet emitting lamp located at a first focus, is located so that the second focus of the ellipse corresponds to the bottom surface of a substrate article to be cured. Most of the coating to be cured is borne on the top surface. The position of the lamp results in substantially complete curing of a coating borne on vertical or substantially vertical side walls of the substrate article.

The energy input to the lamps per square centimeter of coating cured in carrying out the present invention is less than about 50 joules, is preferably less than about 40 joules and is most preferably less than about 35 joules.

The coating can be cured by conveying coated substrate articles past the ultraviolet sources at a rate of at least about 9 meters per minute.

DESCRIPTION OF THE PREFERRED EMBODIMENTS

As used herein, ultraviolet is defined as radiation within the wavelength between about 200 and 450 nanometers.

The substrate to which the process is applied may be formed from a variety of materials such as, for example, masonite, wood and MDF. According to one process, masonite is coated with a white thick pigmented coating to form a dry erase white board. The coating method and apparatus might also be applied to wood boards. However, the use which is expected to be most prevalent, and which is described in the background section, is the coating of MDF. MDF having a thick pigmented coating, particularly black or white, is commonly used in furniture, e.g., shelves, tables, etc. MDF for use in furniture is usually about one inch thick and is coated on vertical as well as a horizontal surface edges.

The coating treated in accordance with the present invention is a thick pigmented coating. The term "thick" as used herein refers to a coating which is at least about 1 mil thick and preferably about 2 mils to about 10 mils thick. In the case of the black coating the pigment can be provided in the form of carbon black. In the case of the white coating the pigment may be provided in the form of titanium oxide. The pigment can be usually provided in an amount of about 10% to about 40% by weight of the solids content of the finished coating. The higher amounts of pigments, i.e., those in the range of about 40%, are provided in high quality coatings. By way of a non-limitive example the coating may be of the acrylate or urethane type, and other photocurable coatings can be used when desired. A preferred black coating is High Gloss Black UV Topcoat #EA090W, and a preferred white coating is High Gloss White UV Topcoat #EA074W. Both of these coatings are manufactured by Crown Metro, Inc., Greenville, S.C.

Examples of known methods for applying coatings include roll coating, spray coating and curtain coating. Roll coating has the advantage that the coating equipment is relatively inexpensive, but it also has the disadvantage that it presents problems in laying down a thick coating. Spray coating can provide a thick level coating yet a certain amount of spray misses the substrate and is wasted. Curtain coating provides a smooth coating the thickness of which can easily be controlled and it does not waste coating material. The method of applying the coating does not affect the use of the process and apparatus for curing the coating according to the present invention.

Figure 1:
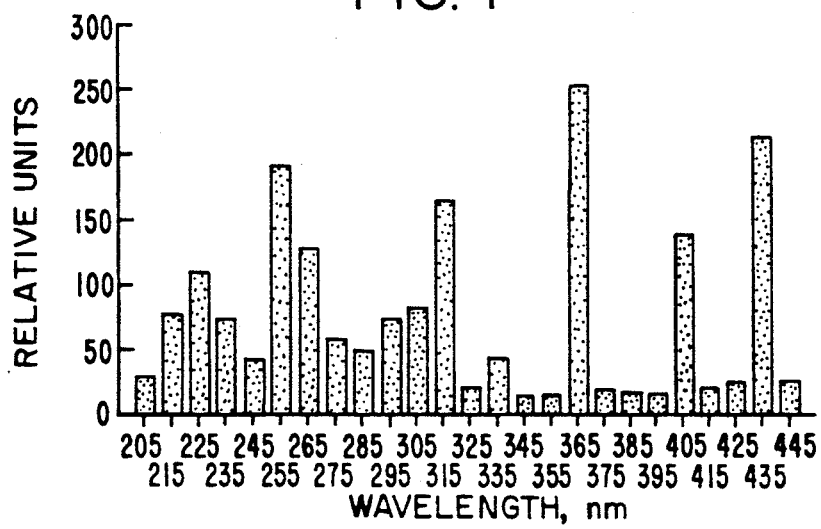
FIG. 1 is a graph of the spectral energy distribution of a high intensity discharge, medium pressure, non-doped mercury lamp used according to the invention.

FIG. 1 is a graph of the spectral energy distribution of a high intensity discharge, medium pressure non-doped mercury lamps used according to the invention. The spectrum is characteristic of primary radiating component, i.e., mercury. Such lamps generally comprise mercury and up to a few hundred Torr of argon which is provided for starting purpose. The filling of such lamps is known. The lamp may be an arc lamp or a microwave electrodeless lamp. Both are known types of discharge lamps. As is apparent from FIG. 1, the non-doped mercury lamp emits radiation in selected bands throughout the ultraviolet spectrum from about 200 to about 450 nanometers.

Figure 2:
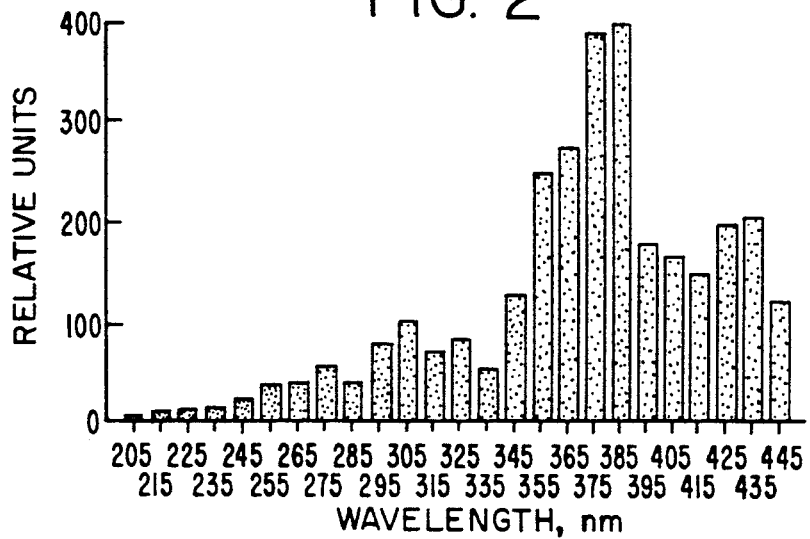
FIG. 2 is a graph of the spectral energy distribution of a high intensity discharge, medium pressure, doped mercury lamp, the output of which is peaked at 385 nanometers and is substantial in the range of 350–450 nanometers, which is used according to the invention.

FIG. 2 is a graph of the spectral energy distribution of a high intensity discharge, medium pressure doped mercury discharge lamp, the output of which peaks at about 385 nanometers and is primarily in the range of 350–450 nanometers, which range is effective in curing thick UV-curable coatings according to the invention. The spectral energy distribution shown is best obtained by doping a mercury lamp bulb with a small amount of iron. Fusion Systems Corp, the assignee of the instant invention, manufactures high intensity discharge, medium pressure discharge, microwave electrodeless lamps, and offers bulbs identified as the V-Bulb for those lamps which produce a spectrum as shown in FIG. 2.

Figure 3:
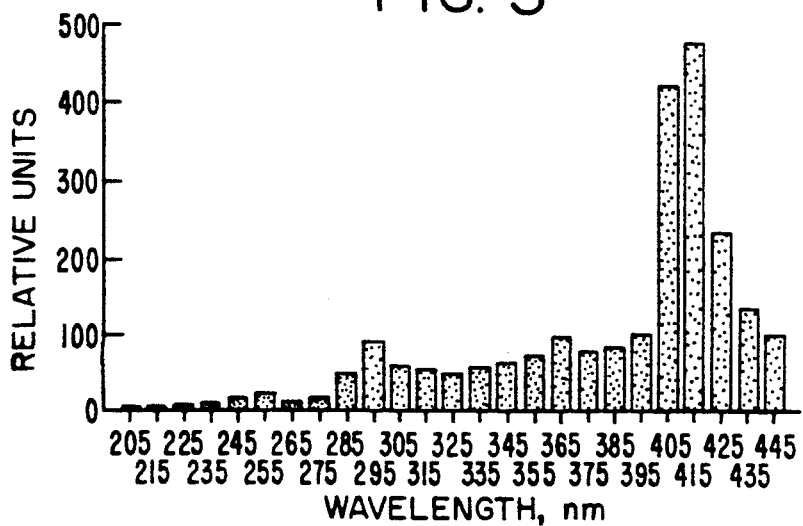
FIG. 3 is a graph of the spectral energy distribution of a high intensity discharge, medium pressure doped mercury lamp, the output of which is peaked at 410 nanometers and is substantial in the range of 400 nanometers to 450 nanometers.

FIG. 3 is a graph of the spectral energy distribution of a high intensity discharge, medium pressure doped mercury lamp, the output of which peaks at 410 nanometers and is most intense in the range of 400 nanometers to 450 nanometers. The spectral energy distribution shown is best obtained by doping a mercury lamp with a small amount of gallium. Fusion Systems also offers a bulb identified as the D-Bulb for a lamp which produces a spectrum as shown in FIG. 3.

The spectrums shown in FIGS. 2 and 3 may be produced by arc lamps which are doped with iron and gallium, respectively. However, at the current state of the art arc lamps, using dopants, have power which is too limited because at high power the period for which the spectrums characteristic of the dopant persists is short. Since the method according to this invention requires high power, microwave electrodeless lamps are preferred for the lamps from which the radiation according to FIGS. 2 and 3 is to be obtained.

Figure 4:
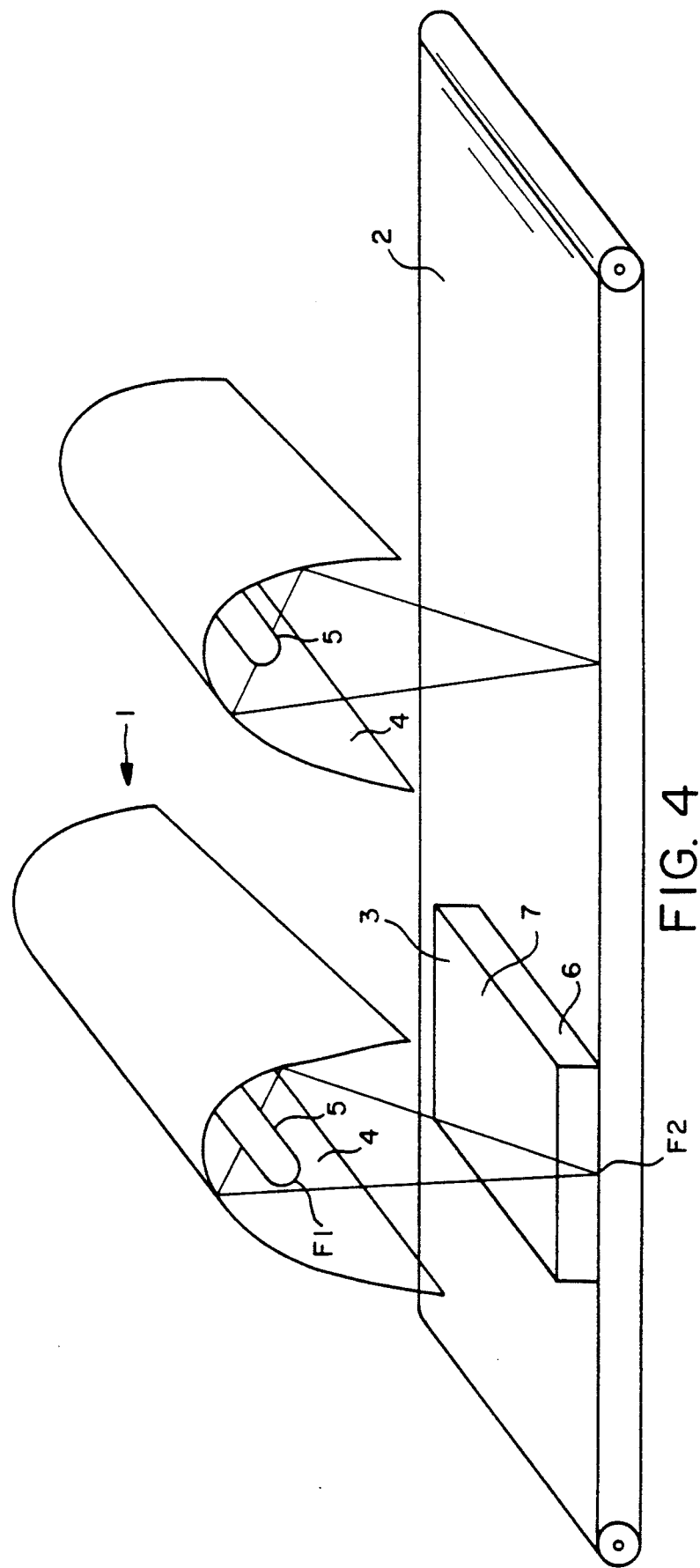
FIG. 4 is schematic perspective view of an ultraviolet curing station.

In FIG. 4, which shows an ultraviolet curing station, a first lamp 1 is arranged in relation to a conveyor 2 so that a line at which radiation from the lamp 1 is focused is across at least a portion of the width of the conveyor 2 through which coated substrate article(s) 3, such as an MDF pass. The lamp optics comprise a specular elliptical cylindrical reflector 4 having a linear bulb 5 disposed at a first focus F1 of the elliptical cylindrical reflector 4. The elliptical reflector 4 serves to collect and concentrate the ultraviolet emitted from the linear bulb 5 on a line at the second focus F2. The lamp 1 is positioned so that the second focus line F2 is located at the lower surface 6 of the MDF substrate 3 rather than the top surface 7 which bears the coating.

The ultraviolet at the second focus is increased to at least about 10 times compared to its intensity without the reflector, i.e., the isotropic radiation from the source. Without the reflector, the intensity is higher one inch above the line of the focus than it is at the line of the focus because it is closer to the source. However, with the reflector, the intensity one inch above the focus is less than at the focus. For example, the ultraviolet intensity one inch above the focus is about 5 times what it would be without the reflector.

The prior art practice has been to position the lamp relative to the substrate so that the second focus line is at the surface bearing the coating.

Most of the coating on an MDF is borne on the top surface and a small percentage is borne on the vertical edges. It has been discovered by the inventor that positioning the lamp so that the second focus is at the bottom of the MDF results in good curing of the coating on the top surface and the vertical edges. Maximum intensity available from the lamp is not obtained at the top surface and it is uncertain that it is obtained at the bottom of the vertical edge even though that is at the second focus line, because of the orientation of the edge. Nonetheless the advantageous results were obtained.

A second lamp which is the same as described above is located beyond the first lamp in the direction of the conveyor movement.

Substrate articles such as a MDF pass on the conveyor under the illumination of the two lamps. The height of the lamps above the conveyor is adjusted so that the second focus of the reflector is at the bottom of the substrate articles rather than the top which bears most of the coating. Coating borne on the top and vertical edges of the substrate article is cured.

According to a preferred aspect of the invention directed to curing relatively dark coatings the first lamp emits radiation which is of the type described in connection with FIG. 2 and is supplied with power in the amount of at least about 300 and preferably at least about 400 watts per inch of its length. Further, according to this aspect of the present invention, the second lamp is of the type described in connection with FIG. 1 and is supplied with power in the amount of at least about 500 and preferably at least about 600 watts per inch of its length.

If the lamps are operated at the preferred levels the conveyor may be run at about 9 meters/min and good curing is obtained. Thus effective cure is obtained at about 26⅔ joules of lamp input energy per square centimeter of substrate.

According to another preferred aspect of the invention directed to curing relatively light colored coatings both lamp bulbs are supplied with power of at least about 500 and preferably at least about 600 watts per inch of their length. The first lamp is of the type described in connection with FIG. 3 and the second lamp is of the type described in connection with FIG. 1.

If both lamps are operated at about 600 watts per inch the conveyor may be run at at least about 9 meters per minute. Effective cure is obtained at about 32 joules of lamp input power per square centimeter of substrate.

EXAMPLE

The coatings utilized for testing were supplied by Crown Metro, Inc., located in Greenville, S.C., USA.

Two lamp units each about 10 inches long and spaced about 9 inches apart were used. The reflectors were half-ellipses in cross-section with the bulb lying along the focus of the cross-section. The opening of the reflector was spaced about 1 inch above the upper surface of a one inch thick substrate which positioned the second focus at about the under surface of the substrate.

Two coatings were evaluated, a high gloss black UV topcoat #EA090W and a high gloss white UV topcoat #EA074W. Each of the coatings were applied to MDF.

The optimum process conditions were established as follows:

Black UV High Gloss Top Coat (1) Spray apply 3 to 7 mils of coating to a 1 inch thick substrate (2) Flash-off solvent for 2 minutes at 120° F.

(3) Cure in one pass with the "D" lamp operating at 160 w/cm (input power) followed by non-doped bulb at 240 w/cm.(input power)

(4) Rate of cure 9 meters/min.

White High Gloss Topcoat a) Spray apply 3 to 5 mils of coating b) Flash-off solvent for 2 minutes at 120° F.

c) Cure in line with the "V" bulb followed by a non-doped bulb, each operating at 240 w/cm(input power)

d) Rate of cure 9 meters/min.

The pencil hardness of both coatings measured according to ASTM test standard 0-3363-74 was greater than 6H.

The gloss at 60 degrees for both coatings measured by a Gardner gloss meter was greater than 90 gloss units.

The lamp input power is directly related to the ultraviolet output. The above example of curing a white coating requires both lamps to operate at 240 watts/cm for the white coating as opposed to one at 160 watts/cm for the black coating. This difference may be due to reflectivity of the white coating.

For the white coating process described above, the lamp input energy per square centimeter of cured coating is 32 joules. For the black coating process, it is 26⅔ joules.

Conveyor speed of up to 9 meters per minute have been obtained for two lamp curing systems according to the invention. It is contemplated that increasing the number of lamps would allow a proportional increase in the conveyor speed.

Although examples have been given for only black and white coatings, the present invention is applicable to other coating colors. In the Munsell system of indicating color by three coordinates, the value number indicates the relative darkness and lightness of the color. In accordance with the Munsell system, the word "dark" herein includes a color that has a Munsell number of less than 5 and "light" includes a color that has a Munsell number of 5 or more.

We claim:

1. A process of curing an ultraviolet radiation curable pigmented coating of a coated substrate with a coated surface and an opposing surface, said coating having a thickness of at least about 1 mil, said process comprising the steps of:
   linearly focusing radiation on said coated substrate from a first source of ultraviolet energy comprising a linear lamp having a first spectral energy distribution wherein at least about 50% of its spectral energy is in the range from about 300 to about 450 nanometers, and which is powered at an energy level of at least about 300 watts per inch of lamp length;
   linearly focusing radiation on the resulting irradiated coated substrate from a second source of ultraviolet energy comprising a linear lamp having a second spectral energy distribution which differs from said first spectral energy distribution and has its spectral energy distributed in discrete regions throughout the range of about 200 to about 450 nanometers, said second source of ultraviolet energy being provided with an input power of at least about 300 watts per inch of lamp length; and,
   conveying the coated substrate past said first and second sources of ultraviolet energy during the steps of irradiation.

2. A process according to claim 1 wherein said first and said second ultraviolet energy sources are powered at at least about 500 watts per inch of width of the coating.

3. A process according to claim 1 wherein said first and said second ultraviolet energy sources are powered at at least about 600 watts per inch of width of the coating.

4. A process according to claim 1 wherein said pigment coating is a light-colored coating, said first and second sources of ultraviolet radiation are each powered at at least about 400 watts per inch of coating width, and at least about 50% of the spectral energy from said first source of ultraviolet energy is in the range of 400 to about 450 nanometers.

5. A process according to claim 4 wherein said first and said second ultraviolet energy sources are powered at at least about 500 watts per inch of width of said coating.

6. A process according to claim 1 wherein said thick pigment coated is a dark coating, and at least about 60% of the spectral energy from said first source of ultraviolet energy is in the range of about 350 to about 450 nanometers.

7. A process according to claim 6 wherein said second ultraviolet energy source is powered at at least about 500 watts per inch of width of the coating.

8. A process according to claim 6 wherein said second ultraviolet energy source is powered at at least about 600 watts per inch of width of said coating.

9. A process according to any one of claims 1, 4, or 6 wherein said coating is selected from a group consists of acrylate and urethane based coatings.

10. A process according to any one of claims 1, 4, or 6 wherein the total energy applied to said first and second sources of energy is less than about 50 joules per square centimeter of coating cured.

11. A process according to any one of claims 1, 4, or 6 wherein said substrate is conveyed past said first and second ultraviolet energy sources at a rate of no less than about 5 meters per minute.

12. A method according to any one of claims 1, 4, or 6 wherein said substrate articles are conveyed past said first and said second ultraviolet energy sources at a rate of at least about 9 meters per minute.

13. A process according to claim 1 wherein said substrate is irradiated with ultraviolet from more than one first ultraviolet radiation source.

14. A process according to claim 1 wherein said substrate is irradiated with ultraviolet from more than one second ultraviolet radiation source.

15. A process according to any one of claims 1, 4 or 6 wherein said coating is about 2 to about 10 mils thick.

16. A process according to any one of claims 1, 4 or 6 wherein said coating contains pigment in the amount of about 10 to about 40 percent by weight.

17. A process according to any one of claims 1 or 6 wherein said coating contains carbon black.

18. A process according to claim 4 wherein said coating contains titanium dioxide.

19. A process according to claim 1 wherein:
   said coated substrate includes a coated upper surface, a lower surface and a coated edge surface; and,
   said radiation is directed towards said upper surface and focussed at or near said lower surface.

* * * * *